F. N. SPRAGUE.
SHACKLE FOR THE SPRINGS OF AUTOMOBILES AND OTHER VEHICLES.
APPLICATION FILED NOV. 30, 1915.
1,190,966.
Patented July 11, 1916.
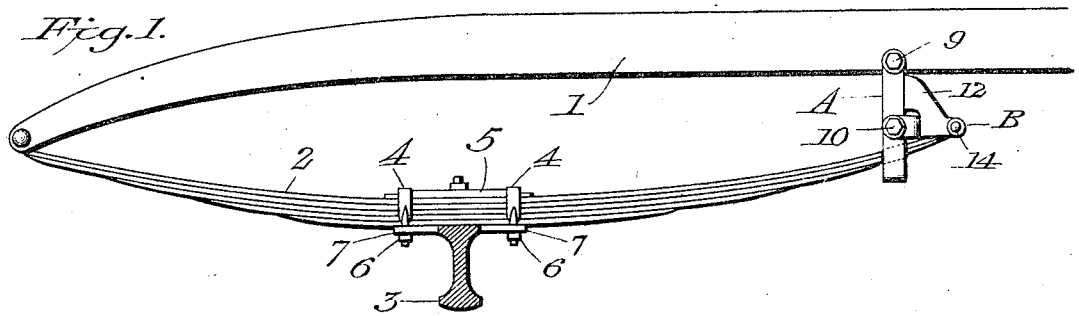
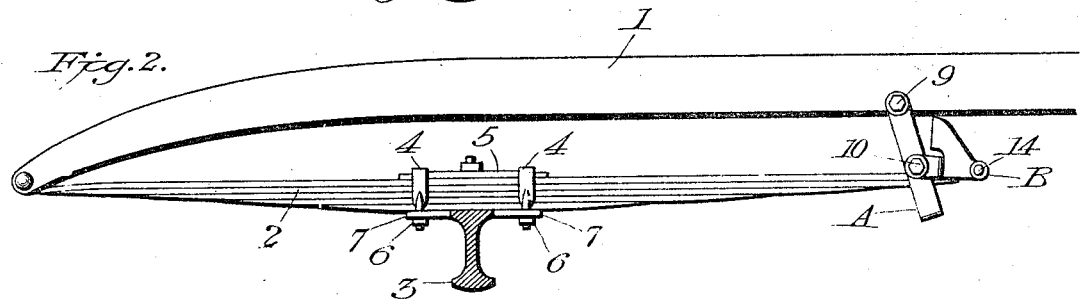
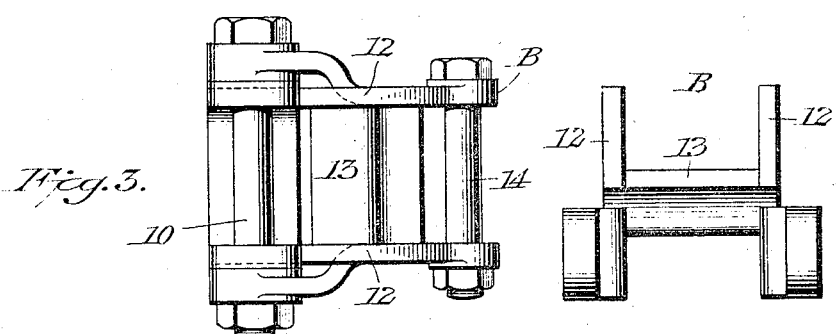
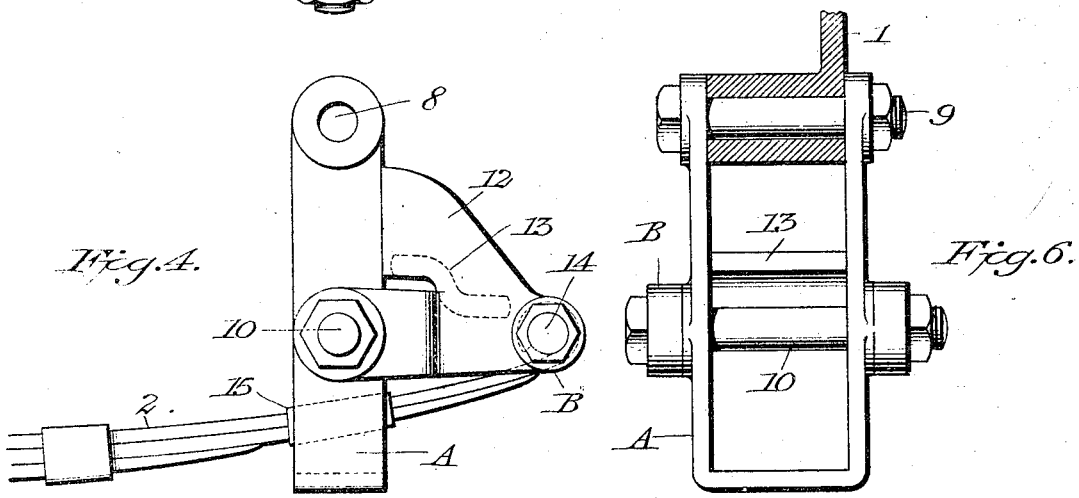
Witnesses:
G. Sargent Elliott.
Adella M. Fowle
Inventor:
Frank N. Sprague.
By H. S. Bailey, Attorney.

UNITED STATES PATENT OFFICE.

FRANK N. SPRAGUE, OF SEDGWICK, COLORADO.

SHACKLE FOR THE SPRINGS OF AUTOMOBILES AND OTHER VEHICLES.

1,190,966.  Specification of Letters Patent.   Patented July 11, 1916.

Application filed November 30, 1915. Serial No. 64,284.

*To all whom it may concern:*

Be it known that I, FRANK N. SPRAGUE, a citizen of the United States of America, residing at Sedgwick, county of Sedgwick, and State of Colorado, have invented a new and useful Shackle for the Springs of Automobiles and other Vehicles, of which the following is a specification.

This invention relates to improvements in clips or shackles for vehicle springs, and more particularly for springs designed for use in connection with automobiles and the like.

The object of the invention is to provide a clip or shackle for connecting one end of the spring to the side bar of the vehicle, which shackle is so constructed and arranged that the resiliency of the spring is thereby automatically increased or diminished, to meet the demands of varying road and load conditions. Further, to provide a clip or shackle for securing one end of a spring to the side bar of a vehicle, which shackle is so constructed as to permit the full resiliency of the spring under average road and load conditions, but which eliminates a portion of the length of the spring when the same is under more than average compression, whereby the resiliency of the spring is diminished, the said shackle being adapted to check or render less quick the rebound of the spring, thus preventing undue jolting. These objects are accomplished by the form of shackle illustrated in the accompanying drawings, in which:

Figure 1, is a side view of a portion of the side bar of an automobile, showing one of the side springs secured thereto at its front end in the usual manner, the rear end being connected to the bar by the improved shackle. Fig. 2, is a side view similar to Fig. 1, but showing the action of the shackle when the spring is under more than average compression. Fig. 3, is an enlarged plan view of the shackle. Fig. 4, is a side view thereof, a portion of the spring being shown in connection therewith. Fig. 5, is a front view of the spring end supporting member of the shackle, and Fig. 6, is an end view of the shackle, showing the manner of connecting the same to the side bar of the vehicle.

Referring to the accompanying drawings, the numeral 1, indicates the side bar of the frame of an automobile, to the forward end of which is secured in the usual manner one end of an ordinary semi-elliptical spring 2, the opposite end of which is connected by the improved shackle to the said side bar, in a manner to be presently described. The spring is connected to the forward axle 3, by U-clips 4, which bear upon the stepped ends of a plate 5, which rests upon the top leaf of the spring, the threaded ends of the clips being secured by nuts 6 to horizontal plates 7, which form an integral part of the axle.

The improved shackle comprises a main yoke shaped hanger A, the free ends of which are provided with holes 8, for the reception of a bolt 9, which passes through the said holes 8, and through the side bar 1, as shown in Fig. 6, thus permitting a swinging engagement of the hanger with the side bar. A bolt 10 passes through the sides of the hanger slightly below the center of its length, and upon this bolt is mounted the spring end receiving member B of the shackle, which comprises parallel side members, which for a portion of their length are the same distance apart as the side members of the hanger, but their inner ends are spread as shown to lie against the outside faces of the sides of the hanger, and these ends have holes for the reception of the bolt 10, by which a hinge connection is formed between the hanger and the member B. The sides of the member B have upwardly extending abutment lugs 12, which normally bear against the adjacent edges of the sides of the hanger, and the parallel sides of the member B are connected by an integral web 13. A bolt 14 passes through the outer ends of the member B, and this bolt supports the inner end of the upper leaf of the spring, the said spring end being rolled to form an eye through which the bolt passes, in the usual manner. The portions of the spring leaves which lie between the sides of the hanger, are protected against wear by a shield 15, in the form of a metal strip, which is folded around the leaves and secured thereto in any suitable manner.

Under average conditions, either when the vehicle is at rest or when the springs are not subjected to violent compression, the lugs 12 of the spring supporting member B engage the adjacent edges of the sides of the hanger, even when the hanger is swung slightly to one side by the straightening out of the spring under average compression. But when the spring is compressed to an extent that causes it to bear forcibly against the bolt 10, the full resiliency of the spring is checked, as that part of the spring beyond the bolt 10 is eliminated as a cushioning factor, and the spring pressure is exerted between the bolt 10 and the bolt at the forward end of the spring, and the member B swings slightly on its pivot bolt so that the abutment lugs 12 are out of engagement with the sides of the hanger. The lifting power of the spring, on the beginning of the rebound, is thus exerted against the bolt 10, but as the spring assumes its normal curve, the member B is swung up by the contraction in the length of the spring until the lugs 12 again engage the edges of the hanger, when the lifting power is instantly transferred from the bolt 10 to the bolt 14, when the said power is exerted at an angle on a line through bolts 14 and 9, instead of in a direct line, and as the spring is weakened by the coming into action of added length or that part thereof beyond the bolt 10, the lifting power is retarded, and the rebound is therefore less quick and correspondingly freer from jolt. Should the vehicle body be thrown by the rebound far enough to cause the side bars to pull upon the springs, the member B will be swung out of engagement with the hanger, and the closed end of the hanger will engage the spring, thus relieving the adjacent end of the spring of the excessive pull. The hanger prevents lateral movement of the end of the spring and guides the same under compression and rebound.

From the foregoing it will be seen that under average conditions of road and load, the full resiliency of the spring is exerted, and the arrangement of the improved shackle causes a slow and therefore easy rebound; but the full resiliency is checked under excessive compression, when the spring acts against the bolt 10, instead of bolt 14.

Having described my invention, what I claim as new and desire to secure by Letters Patent, is:

1. The combination with the axle and side bar of a vehicle, of a leaf spring secured substantially midway of its length to the axle, and at one end to said side bar, a hanger pivotally connected to the side bar adjacent the opposite end of the spring, a member hinged to said hanger and extending at right angles thereto, the free end of which supports the adjacent end of said spring, and abutments on said hinged member which engage the hanger.

2. The combination with the axle and side bar of a vehicle, of a leaf spring secured substantially midway of its length to said axle and at one end to said side bar, a U-shaped hanger hinged to said side bar through which the opposite end portion of the spring passes, a member hinged to said hanger and extending at right angles thereto, having a bolt in its free end to which the adjacent end of the spring is secured, and abutments on said hinged member which normally engage said hanger.

3. A shackle for securing one end of a spring to the side bar of a vehicle, comprising a U-shaped hanger, a bolt extending through the same adjacent its center, a member pivotally mounted on said bolt, comprising parallel, integrally connected arms having projecting lug portions adapted to normally engage the adjacent edges of said hanger, and a spring-end-receiving bolt which is passed through the outer ends of said arms.

4. The combination with the axle and side bar of a vehicle, of a semi-elliptic spring which is secured substantially midway of its length to said axle, and at one end to said side bar, a U-shaped hanger pivotally connected to said side bar, adjacent the opposite end of the spring, a bolt extending through said hanger below its center, a member pivotally mounted on said bolt comprising parallel portions having upwardly extending abutment lugs, which are adapted to engage the adjacent edges of the hanger, and a bolt which is passed through the free ends of said hinged members, the adjacent end portion of said spring being passed through said hanger and supported at its extremity upon the bolt which passes through the outer ends of the hinged member.

5. The combination with the axle and side bar of a vehicle, of a semi-elliptic spring secured substantially midway of its length to said axle, and at one end to said side bar, a hanger pivotally connected to said side bar adjacent the opposite end portion of said spring, a member hinged to said hanger and extended at right angles to the same, means for connecting the adjacent end of said spring to the outer end of said hinged member, and abutments on said hinged member which normally engage said hanger.

6. The combination with a side bar and an axle of a vehicle, of a semi-elliptic leaf spring secured substantially midway of its length to said axle and connected at one end to said side bar, a U-shaped hanger pivotally secured to said side bar through which the opposite end portion of the spring passes, a bolt extending through said hanger above said spring, a member pivotally mounted on said bolt and extending at right angles to said hanger, a bolt in the extremity of said member on the same plane with its hinge bolt, upon which the extremity of said spring is mounted, abutments on said member which normally engage said hanger, and a wearing shield on said spring where it passes through the hanger.

7. A shackle for securing one end of a spring to the side bar of a vehicle, comprising a hanger, a member hinged thereto and extending at right angles to the hanger, and having a spring end receiving bolt in its free end, and abutments on said member adapted to normally engage said hanger.

In testimony whereof I affix my signature in presence of two witnesses.

FRANK N. SPRAGUE.

Witnesses:
G. SARGENT ELLIOTT,
ADELLA M. FOWLE.